(12) United States Patent
Mogi et al.

(10) Patent No.: US 6,810,726 B2
(45) Date of Patent: Nov. 2, 2004

(54) WHEEL DURABILITY TEST EQUIPMENT

(75) Inventors: Hiroyuki Mogi, Saitama (JP); Yoshiaki Hamada, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 18 days.

(21) Appl. No.: 10/350,099

(22) Filed: Jan. 24, 2003

(65) Prior Publication Data

US 2003/0217594 A1 Nov. 27, 2003

(30) Foreign Application Priority Data

Jan. 24, 2002 (JP) ........................................ 2002-015542

(51) Int. Cl.⁷ ............................................. G01M 17/02
(52) U.S. Cl. ....................................................... 73/146
(58) Field of Search ................................. 73/146–146.8

(56) References Cited

U.S. PATENT DOCUMENTS

| | | | | |
|---|---|---|---|---|
| 3,847,012 A | * | 11/1974 | Sperberg | .......................... 73/8 |
| 4,848,143 A | * | 7/1989 | Ushikoshi | ..................... 73/146 |
| 4,949,574 A | * | 8/1990 | Linden et al. | ................. 73/146 |
| 5,111,687 A | * | 5/1992 | Hill | .............................. 73/146 |
| 6,178,814 B1 | * | 1/2001 | Curtis | .......................... 73/146 |

FOREIGN PATENT DOCUMENTS

| | | | | |
|---|---|---|---|---|
| JP | 02159537 A | * | 6/1990 | .......... G01M/17/02 |
| JP | 04181142 A | * | 6/1992 | .......... G01M/17/02 |
| JP | 09-288046 A | | 4/1997 | |
| JP | 2002131191 A | * | 5/2002 | .......... G01M/17/02 |

* cited by examiner

*Primary Examiner*—Edward Lefkowitz
*Assistant Examiner*—Jermaine Jenkins
(74) *Attorney, Agent, or Firm*—Birch, Stewart, Kolasch & Birch, LLP

(57) ABSTRACT

Equipment for testing wheel durability in which the marginal portion of the rim portion of the wheel is mounted to the rotary disk with one end of the moment shaft and the spindle shaft corresponding to the axle being mounted to the disk portion of the wheel. The rotary disk is rotated in a state in which a load is applied to the other end of this moment shaft for thereby evaluating the durability of the wheel. The marginal portion of the wheel is mounted to the rotary disk while pressing with the pressing member obtained by dividing a ring-shaped plate into two. The pressing member permits the mounting of the wheel to the rotary disk with an uniform pressing force in the circumferential direction and prevents rattling, local deformation and the like of the wheel.

17 Claims, 8 Drawing Sheets

WHEEL DURABILITY TEST EQUIPMENT

CROSS-REFERENCE TO RELATED APPLICATIONS

The present nonprovisional application claims priority under 35 USC 119 to Japanese Patent Application No. 2002-015542 filed on Jan. 24, 2002 the entire contents thereof is hereby incorporated by reference.

BACKGROUND OF THE INVENTION

1. Field of the Invention

The present invention relates to equipment for testing wheel durability wherein marginal portion of a rim is uniformly pressed when mounting a wheel, the wheel is rendered capable of being evaluated in a state closer to an actual vehicle state, and yet it is arranged so as to reduce damage on a load applying means side which applies a load to an axle corresponding member.

2. Description of Background Art

The durability of a vehicle wheel is evaluated by equipment for testing wheel durability in a state close to an actual vehicle state.

More specifically, a wheel for testing is mounted on an axle, and the wheel and the axle are rotated in a state in which a load is applied to the axle side or the wheel side to evaluate fatigue strength at each portion of the wheel.

Equipment for testing wheel durability is disclosed in "Wheel Durability Test Equipment" as set forth in Japanese Patent Laid-Open No. 9-288046.

In FIGS. 1 and 3 of Japanese Patent Laid-Open No. 9-288046, equipment for testing wheel durability 20 is described, in which a wheel 10 is mounted on a rotary table 21 (with regard to the reference numerals set forth in this discussion, the reference numerals described in Japanese Patent Laid-Open No. 9-288046 have been used, and so forth) through the use of a plurality of pressing jigs 23. One end of a moment arm 25 corresponding to the axle is mounted on the disk portion of the wheel 10 with bolts and nuts, and a load is applied to the other end of this moment arm 25 by pressing means 32.

The above-described pressing jig 23 is a small board piece-shaped member, and the wheel 10 is pressed by a plurality of pressing jigs 23 in circumferential positions of the rim marginal portion thereof.

In the above-described equipment for testing wheel durability 20, since the rim marginal portion of the wheel 10 is partially pressed by a plurality of board piece-shaped pressing jigs 23, it is difficult to make the pressing force of each pressing jig 23 constant, and it becomes impossible to uniformly press the rim marginal portion. For example, if the pressing force of the pressing jig 23 becomes locally low, it causes the wheel 10 to rattle during a durability test, and if the pressing force becomes high, the rim marginal portion becomes locally deformed.

Also, when a cylinder is used that is driven by hydraulic pressure or pneumatic pressure as a means for applying a load to the tip end of the moment arm 25, the cylinder is directly coupled to the tip end of the moment arm 25. If, for example, the wheel 10 is damaged during the durability test and an excessive external force from the moment arm 25 is exerted on the cylinder, the cylinder will suffer heavy damage and possibly need repair or replacement.

Further, the equipment for testing wheel durability should preferably be able to test in a state closer to the actual vehicle state in order to enhance the accuracy in the evaluation of the wheel durability.

SUMMARY AND OBJECTS OF THE INVENTION

Thus, it is an object of the present invention to improve the equipment for testing wheel durability to thereby uniformly press the rim marginal portion when mounting a wheel, to render the wheel capable of being evaluated in a state closer to an actual vehicle state, and yet to arrange so as to reduce damage on a load applying means side which applies a load to an axle corresponding member.

In order to achieve the above-described object, equipment for testing wheel durability is provided, in which the marginal portion of the rim portion of the wheel is mounted to the rotary disk, one end of the shaft corresponding to the axle is mounted to the disk portion of the wheel, and the rotary disk is rotated in a state in which a load is applied to the other end of this shaft for thereby evaluating the durability of the wheel, wherein the marginal portion of the wheel is mounted to the rotary disk while pressing with the pressing members obtained by dividing a ring-shaped plate into two.

By means of the pressing members obtained by dividing the ring-shaped plate into two, it is possible to mount the wheel to the rotary disk with an uniform pressing force in the circumferential direction, for preventing rattling, local deformation and the like of the wheel.

The present invention includes a shaft that is mounted to the disk portion of the wheel through the hub provided for the vehicle.

Through the use of the hub to be actually provided for the vehicle, it is possible to confirm the fatigue strength of the wheel in a state closer to the actual vehicle state, and in addition thereto, to confirm also the fatigue strength of the hub.

The present invention provides a load that is generated by the weight. For example, even when the wheel is damaged during the durability test and an excessive external force is exerted to the weight through the shaft, the weight is difficult to be damaged.

The present invention provides a weight that is integrally mounted to the tip end of the shaft. It is possible to directly exert the load of the weight on the shaft, and to enhance the testing accuracy.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, with reference to the accompanying drawings, the description will be made of an embodiment of the present invention.

Figure 1:
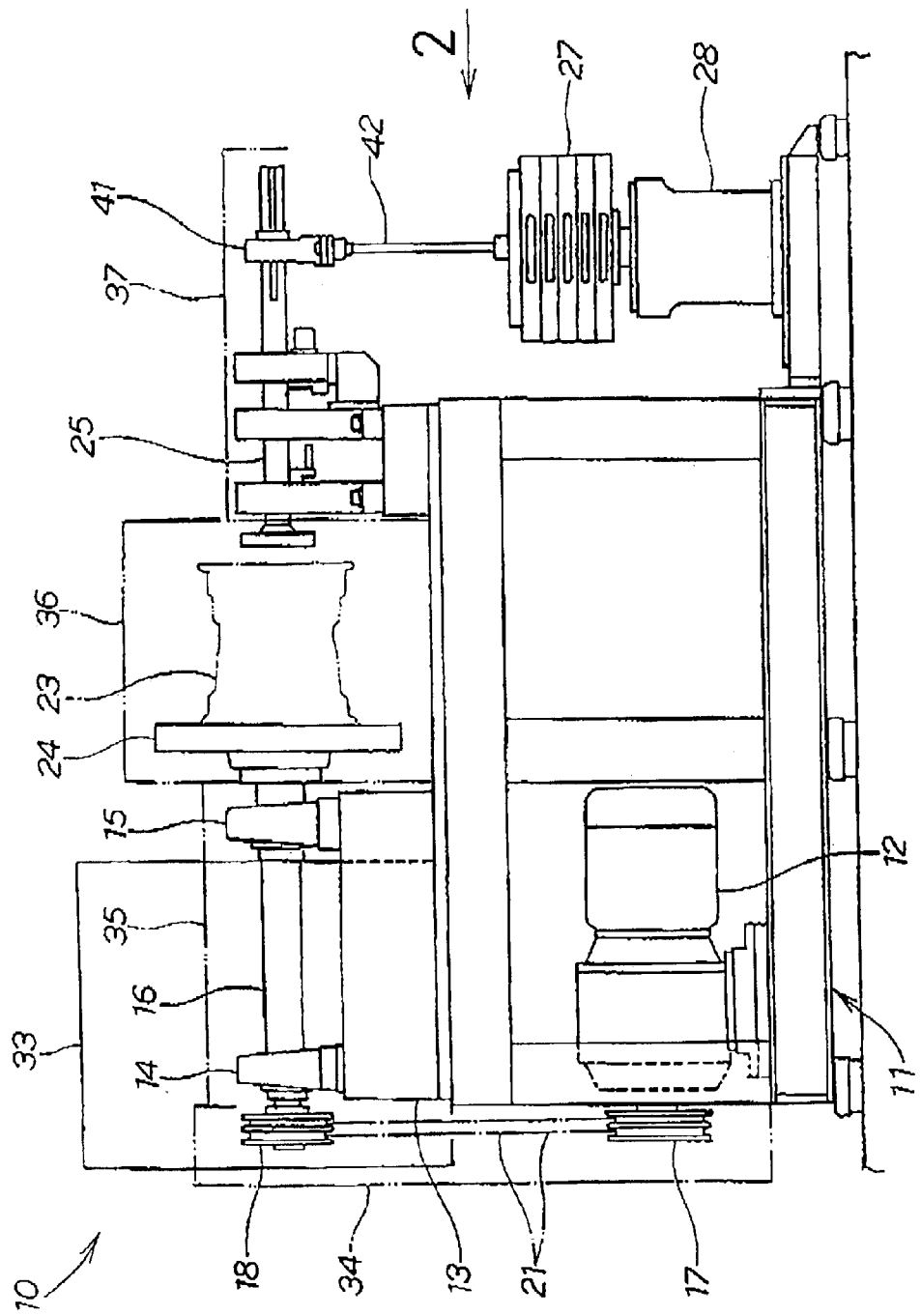
FIG. 1 is a side view showing equipment for testing wheel durability according to the present invention.

FIG. 1 is a side view showing equipment for testing wheel durability according to the present invention. By rotating a vehicle wheel by a predetermined number of revolutions for a predetermined time period in a state in which a load is applied to the vehicle wheel, the equipment for testing wheel durability 10 is used to evaluate fatigue strength at each portion of the wheel. More particularly, the strength of a disk portion, which is a mounting portion for the axle side, a joined portion between the disk portion and a rim portion and the like, in a state close to a state in which the members are mounted onto an actual vehicle. The equipment for testing wheel durability 10 includes a base frame 11 with an electrically-driven motor 12 with a continuously variable transmission installed to this base frame 11. A supporting stand 13 is mounted above the base frame 11 with a driving shaft 16 rotatively supported on this supporting stand 13 through a bearing portion 14, 15. Belts 21, 21 are looped over a driving pulley 17 mounted to the output shaft of the electrically-driven motor 12 and over a driven pulley 18 mounted to the driving shaft 16, respectively. A rotary disk 24 is mounted to the end portion of the driving shaft 16 in order to mount a wheel 23 for the durability test. A moment shaft 25 is provided that corresponds to the axle mounted to a disk portion (not shown) of the wheel 23. A weight 27 is hung in order to apply a load to the end portion of the moment shaft 25. A weight supporting portion 28 is provided for supporting the weight 27. An operation panel 33 is provided together with covers 34 to 37.

Figure 2:
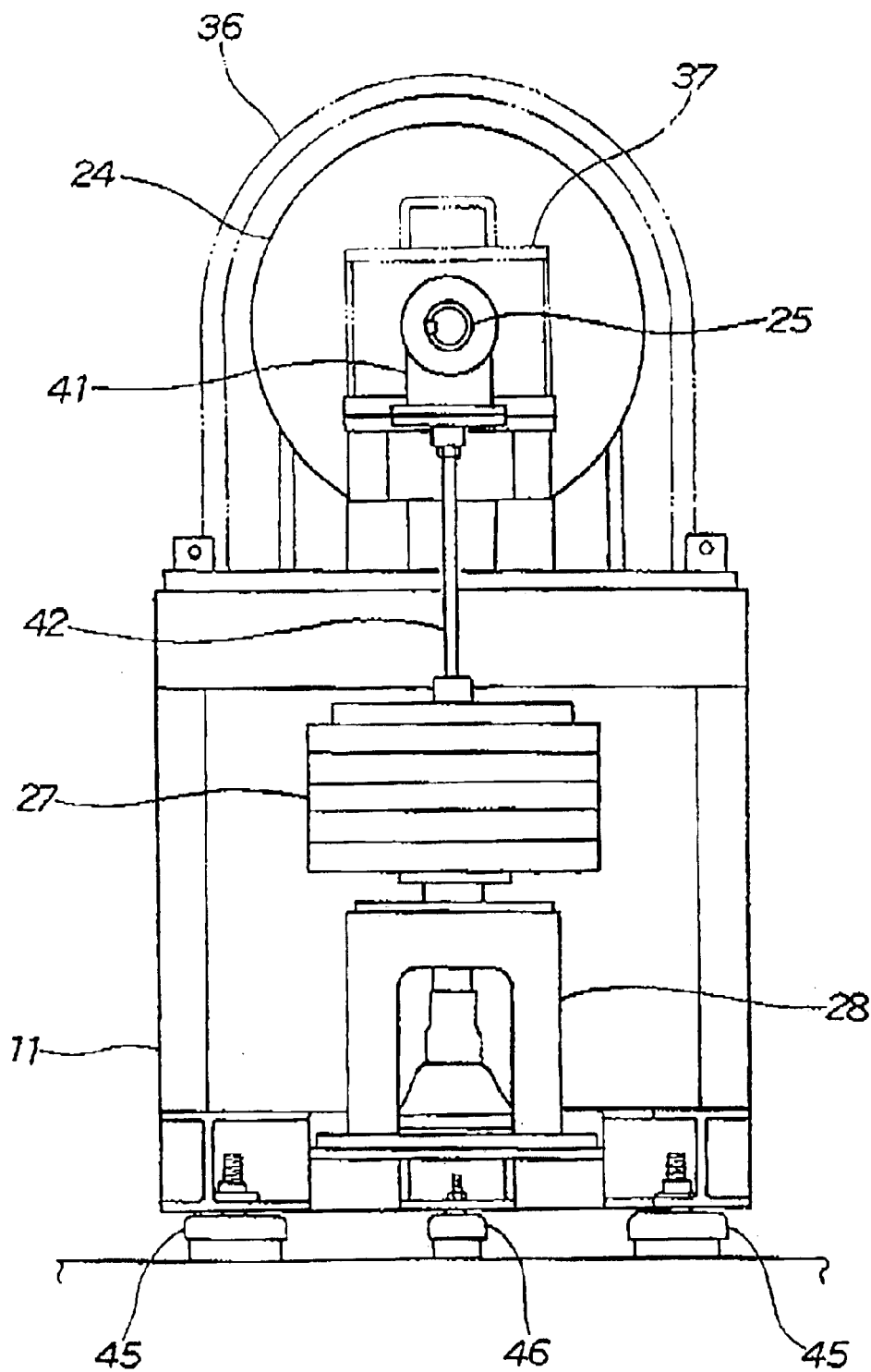
FIG. 2 is a view in the direction of the arrow 2 of FIG. 1.

FIG. 2 is a view taken in the direction of the arrow 2 of FIG. 1, showing a state in which rotating portions of the rotary disk 24, the wheel 23 (See FIG. 1) and the like are covered with the cover 36 mounted to the base frame 11, in which rotating portions of the moment shaft 25 and the like are covered with the cover 37, and in which the weight 27 is coupled to the moment shaft 25 through a weight-side bearing member 41 and a rod 42. Base supporting members 45, 45, 46 are mounted to the lower portion of the base frame 11.

Figure 3:
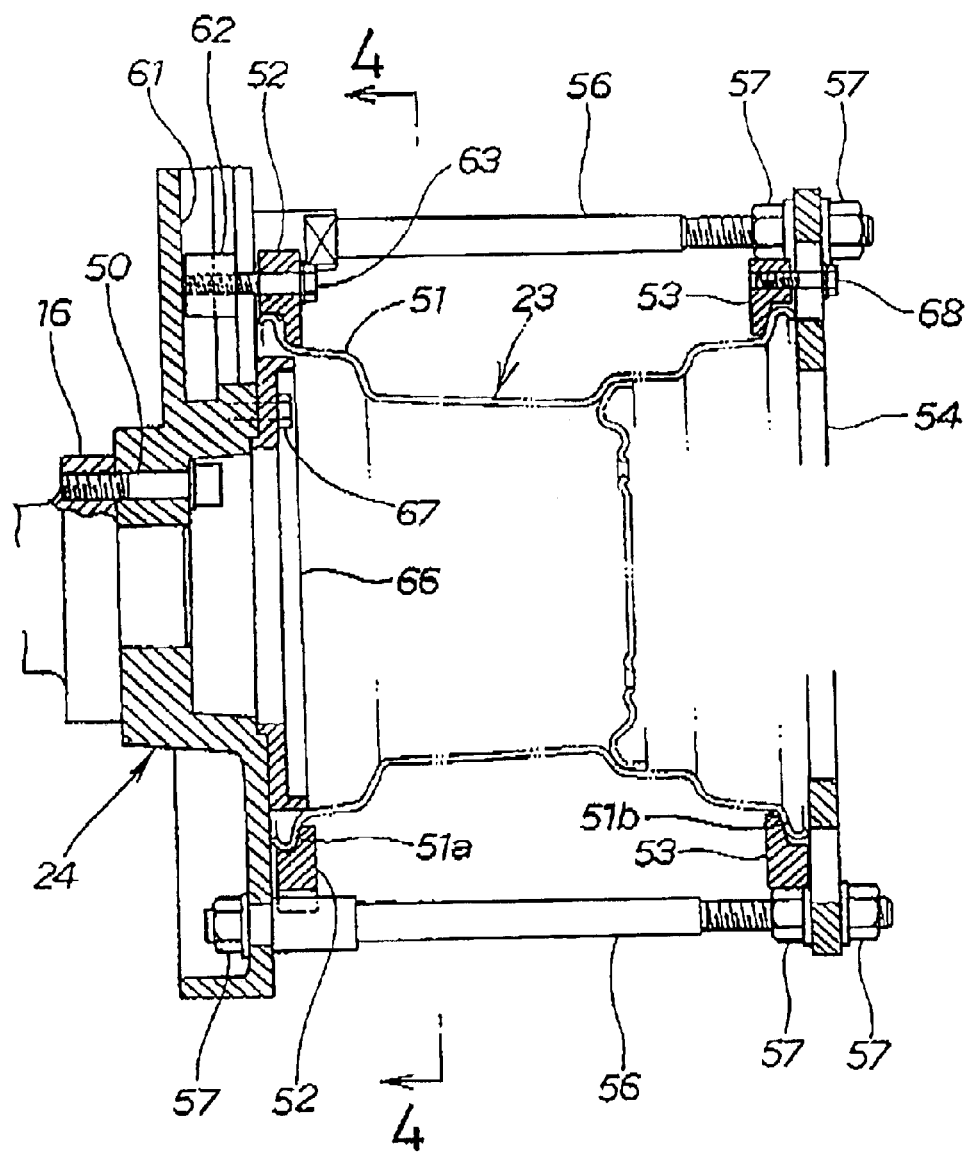
FIG. 3 is a cross-sectional view showing a wheel-mounted state in the equipment for testing wheel durability according to the present invention.

FIG. 3 is a cross-sectional view showing a wheel mounted state for the equipment for testing wheel durability according to the present invention, showing that the rotary disk 24 is mounted to the driving shaft 16 with bolts 50 . . . ( . . . indicates a plurality of pieces, and so forth). One marginal portion 51a of a rim portion 51 of the wheel 23 is mounted to this rotary disk 24 with pressing members 52 and 52, and the other marginal portion 51b in the rim portion 51 is mounted to an auxiliary disk 54 with pressing members 53 and 53. This auxiliary disk 54 is mounted to the rotary disk 24 with long body bolts 56 . . . and nuts 57 . . .

The rotary disk 24 is a member obtained by providing a plurality of hollow portions 61 . . . In the hollow portions 61 . . . , horse-shaped members 62 . . . are movably arranged and held against rotation. Screwing bolts 63 . . . are provided for fastening the pressing members 52, 52 into these horse-shaped members 62 . . . A wheel positioning member 66 is provided for causing, when mounting the wheel 23 to the rotary disk 24, the inner surface of the rim portion 51 of the wheel 24 to fit in to thereby position the rotary disk 24. Bolts 67 . . . are provided for mounting the wheel positioning member 66 to the rotary disk 24. Bolts 68 . . . are provided for mounting the pressing members 53, 53 to the auxiliary disk 54.

Figure 4:
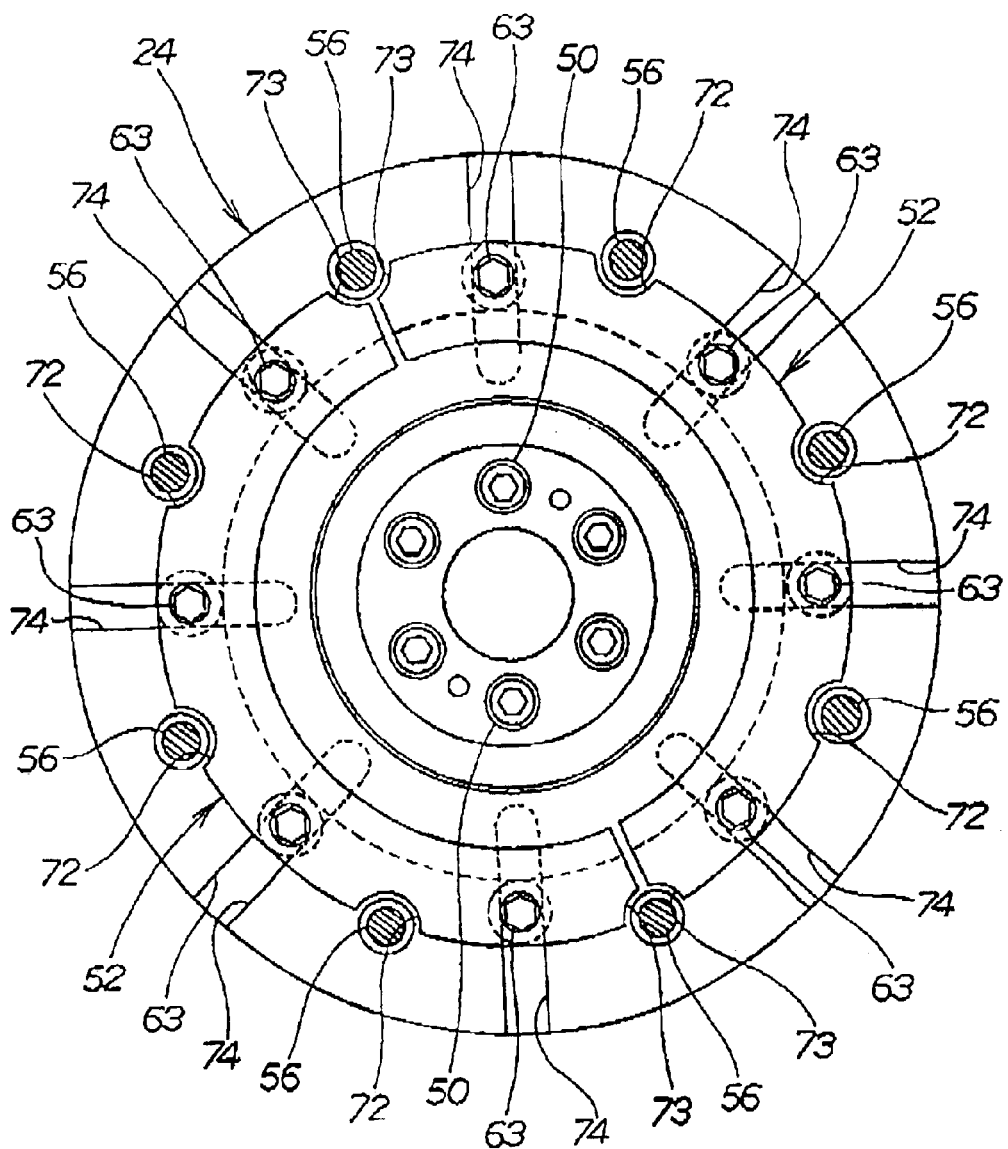
FIG. 4 is a cross-sectional view taken on line 4—4 of FIG. 3.

FIG. 4 is a cross-sectional view taken on line 4—4 of FIG. 3, showing a state in which the wheel 23 (see FIG. 3) is mounted to the rotary disk 24 with the pressing member 52, 52.

The pressing member 52, 52 is a member obtained by dividing a ring-shaped, plate into two. The pressing members 52 and 52 are pressed against the marginal portion 51a of the rim portion 51 of the wheel 23 whereby the wheel 23 is mounted to the rotary disk 24. In this respect, the pressing member 53 (see FIG. 3) is a member having the same shape as this pressing member 52. Notch portions 72 . . . and 73 . . . are provided for causing the long body bolts 56 . . . to escape.

Pressing members 52 and 52 as described above are used, wherein a pressing force at the marginal portion 51a of the rim portion 51 due to the pressing members 52 and 52 becomes uniform in the circumferential direction. For example, the rim portion 51 is not deformed by pressing with a great local force. However, since the pressing force at the rim portion 51 does not become partially low, the wheel 23 does not rattle during the durability test.

The rotary disk 24 is a member obtained by forming, in a radial manner, notch portions 74 . . . which allow the bolts 63 . . . for mounting the pressing members 52 and 52 to pass through. Even if the rim diameter of the wheel to be mounted to the rotary disk 24 is different, pressing members having a size matched with its rim diameter can be used by means of these notch portions 74 . . .

Figure 5:
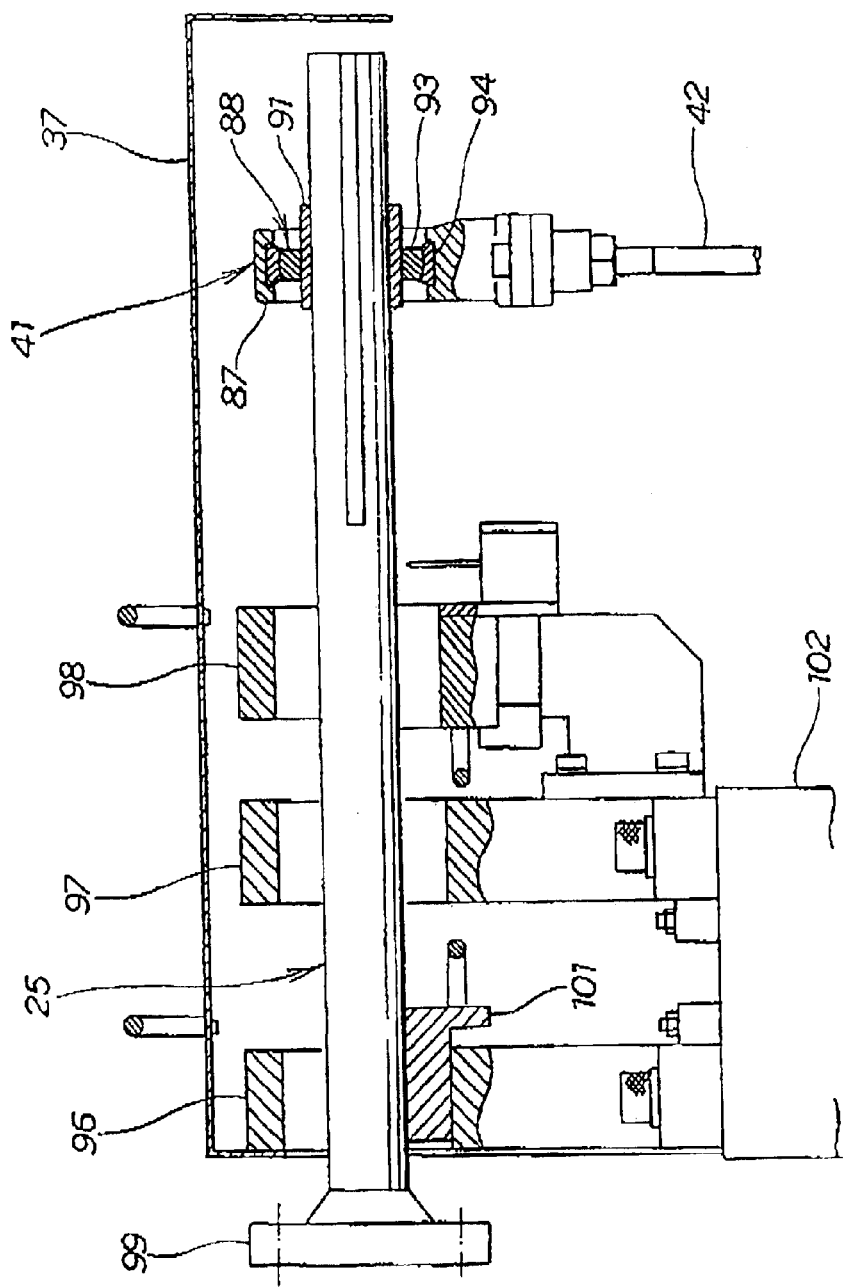
FIG. 5 is a cross-sectional view for explaining a weight-side bearing member for the equipment for testing wheel durability according to the present invention.

FIG. 5 is a cross-sectional view for explaining a weight-side bearing member of the equipment for testing wheel durability according to the present invention. The weight-side bearing member 41 is mounted to the end portion of the moment shaft 25 in order to hang the weight 27 (see FIG. 1) from the moment shaft 25. The weight-side bearing member 41 includes a housing portion 87; a spherical plain bearing 86 contained within the housing portion 87; and a bushing 92 interposed between the spherical plain bearing 88 and the moment shaft 25.

The spherical plain bearing 88 is a component for allowing the moment shaft 25 to incline and to rotate.

The bushing 91 is a member which plays a role as the plain bearing when moving the moment shaft 25 in the axial direction.

An inner race 93 and an outer race 94 are provided for the spherical plain bearing 88, respectively; with run-out preventing members 96, 97 and 98 for restraining great run-out outward of the diameter of a wheel-side end portion 99 of the moment shaft 25. A spacer 101 is provided for alignment of the moment shaft 25 and is inserted inside the run-out preventing member 96 when mounting the moment shaft 25 to the wheel. A shaft-side base 102 is provided to which the run-out preventing members 96, 97 and 98 are mounted.

Figure 6:
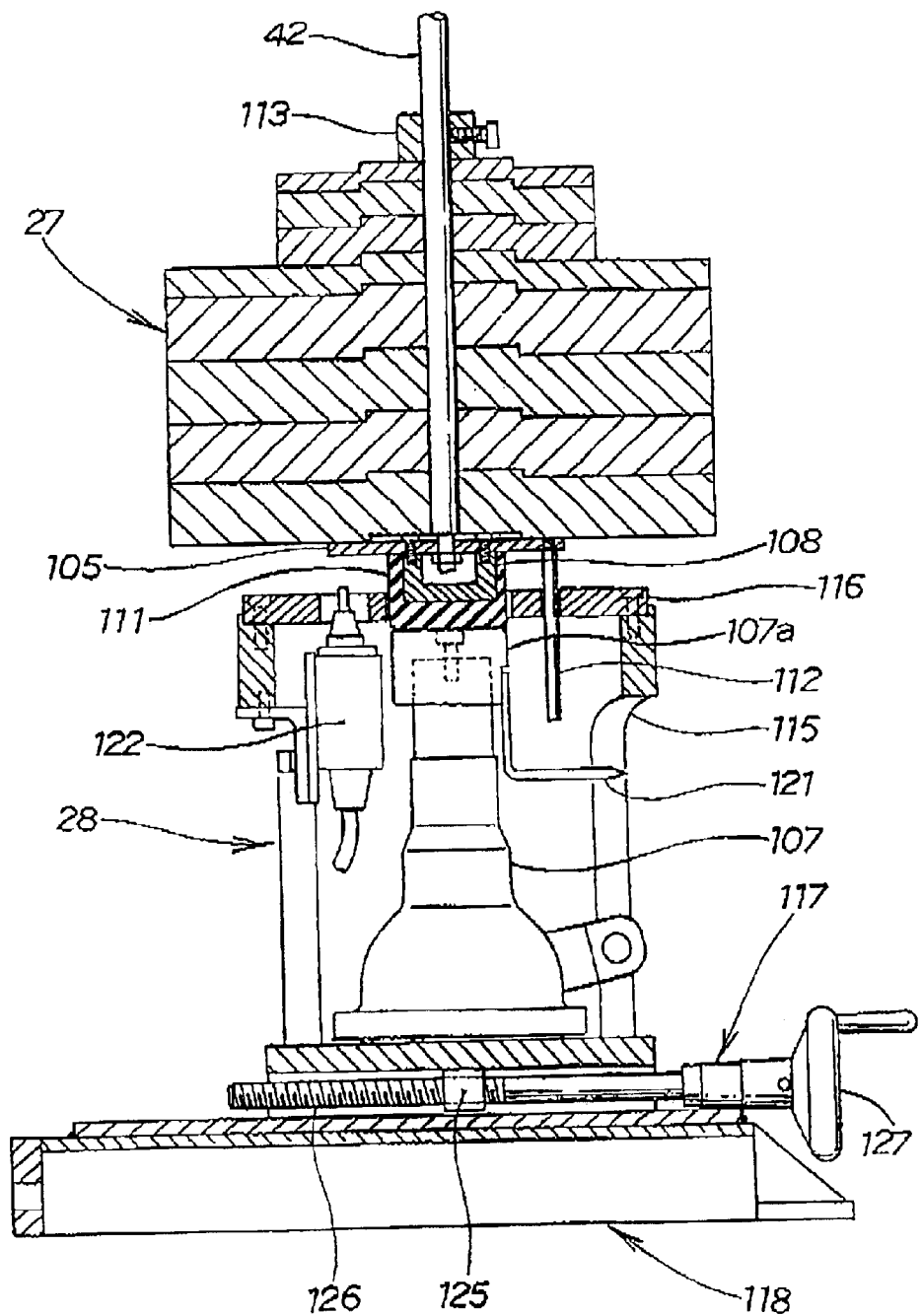
FIG. 6 is a cross-sectional view showing a weight and a weight supporting portion in the equipment for testing wheel durability according to the present invention.

FIG. 6 is a cross-sectional view showing a weight and a weight supporting portion in the equipment for testing wheel durability according to the present invention. A weight supporting plate 105 is mounted to the lower end of a rod 42 with a weight 27 consisting of a plurality of pieces being set on top of the weight supporting plate 105. Weights 27 are supported by a jack 107 constituting the weight supporting portion 28.

A protrusion piece 108 is mounted to the lower part of the weight supporting plate 105 with a cushion 111 made of rubber being provided for covering the protrusion piece 108. A whirl-stop rod 112 extends from the weight supporting plate 105 to the weight supporting portion 28 side in order to prevent the weight 27 from whirling. A ring member is provided for preventing the weight 27 from being lifted.

The weight supporting portion 28 includes a case 115; an upper plate 116 mounted to the upper part of the case 115; the jack 107 contained within the case 115 and a jack moving mechanism 117 arranged below the case 115 in order to horizontally move the jack 107. A weight-side base 118 serves as the base of the weight supporting portion 28. An indicator 121 is provided for indicating a position of a rise and fall portion 107a of the jack 107. A weight fall detection sensor 122 is provided for detecting, when the weight 27 descends, the position of the undersurface of the weight supporting plate 105.

The jack moving mechanism 117 includes a downward protrusion portion 125 provided in, the lower part of the jack 107. A bolt member 126 for thread-combining with an internal thread portion formed on this downward protrusion portion 125 and a handle 127 mounted to the end portion of this bolt member 126.

Figure 7:
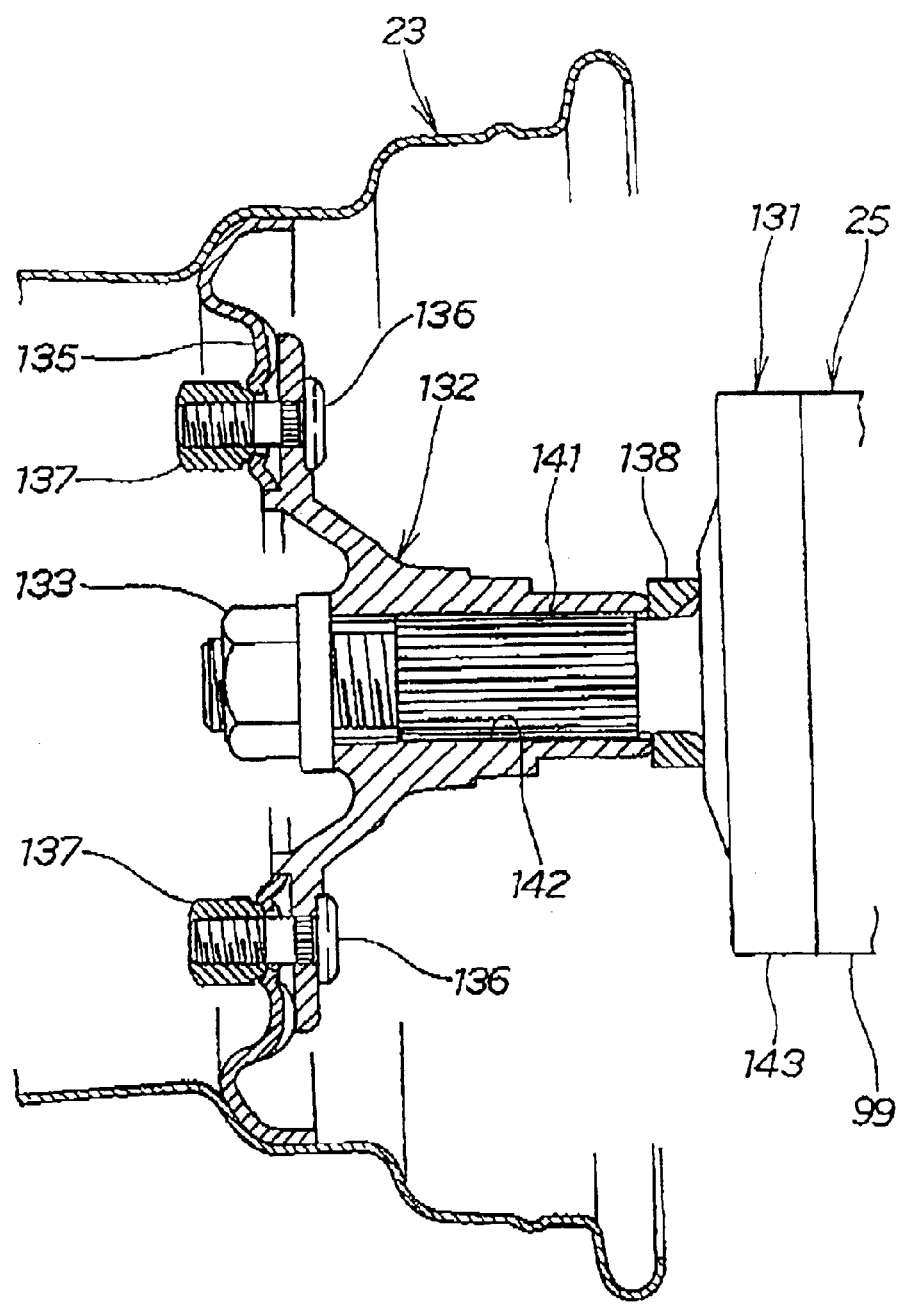
FIG. 7 is a cross-sectional view showing the wheel mounted state in the equipment for testing wheel durability according to the present invention.

FIG. 7 is a cross-sectional view showing a wheel-mounted state for the equipment for testing wheel durability according to the present invention. A spindle shaft 137 is mounted to the wheel-side end portion 99 of the moment shaft 25; a hub 132 is caused to be spline-fitted in the spindle shaft 131 and a nut 133 is screwed into the tip end of the spindle shaft 131 to mount the spindle shaft 131 to the hub 132. The hub 132 is mounted to the disk portion 135 of the wheel 23 mounted to the rotary disk 24 (see FIG. 3, the member arranged on the lefty side of the wheel 23) with stud bolts 136 . . . and wheel nuts 137 . . .

A collar 138 is provided together with a male spline portion 141 formed on the spindle shaft 131. A female spline portion 142 is formed on the hub 132. An end portion flange 143 is provided at the end portion of the spindle shaft 131.

The spindle shaft 131 is a member obtained by fabricating a shaft in the same shape as a spindle shaft for use in any actual vehicle. The hub 132 is a member provided for the actual vehicle.

The above-described moment shaft 25 (see FIG. 5) and the spindle shaft 131 are combined to be used as the shaft according to the present invention.

Figure 8:
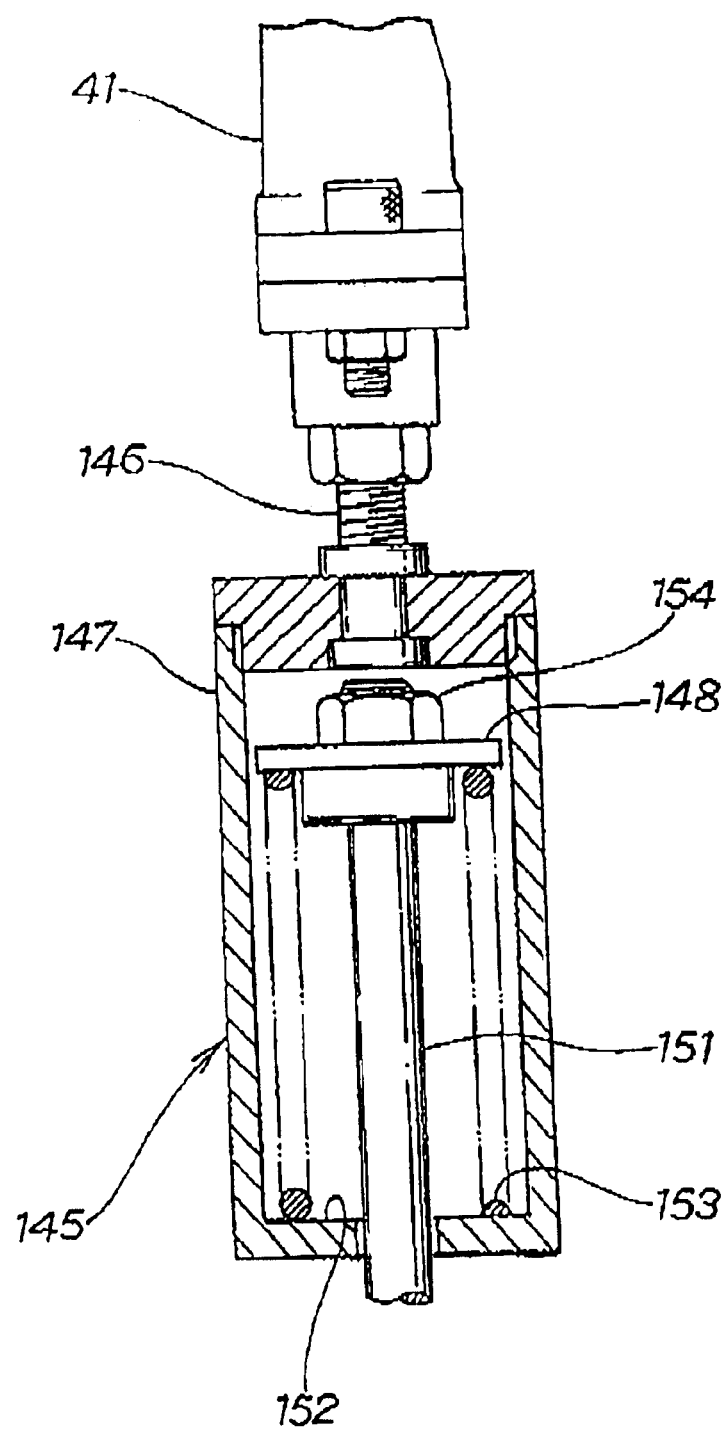
FIG. 8 is a cross-sectional view showing another embodiment of a connected portion between a moment shaft and the weight in the equipment for testing wheel durability according to the present invention.

FIG. 8 is a cross-sectional view showing another embodiment of a connected portion between the moment shaft and the weight in the equipment for testing wheel durability according to the present invention. The weight-side bearing member 41 and the weight 27 (see FIG. 6) are connected together through a damper mechanism 145.

The damper mechanism 145 includes a case member 147 mounted to the weight-side bearing member 41 through a bolt 146; a plate member 148 contained within the case member 147 in such a manner as to be vertically movable; a rod 151, having an upper end mounted to the plate member 148 and having a lower end mounted to the weight 27; and a spring 153 interposed between the plate member 148 and the bottom 152 of the case member 147. When the weight 27 is light-weight, vibration is prevented from being transmitted from the moment shaft 25 to the weight 27 through the damper mechanism 145. Thus, it is possible to securely and uniformly apply the load of the weight 27 to the end portion of the moment shaft 25. A nut 154 is provided for mounting the rod 151 to the plate member 148.

Next, a description will be made of an operation of the equipment for testing wheel durability 10 described above. More specifically, the installation of the wheel 23 and a procedure of the durability test.

First, in FIG. 7, by inserting the stud bolt 136 of the hub 132 into an, installation hole bored in the disk portion 135 of the wheel 23 and screwing the wheel nut 137 to the stud bolt 136, the hub 132 is installed to the wheel 23.

(2) In FIG. 3, by positioning the wheel 23 with a wheel positioning member 66 mounted to the rotary disk 24, and applying the pressing member 52, 52 to the marginal portion 51a of the rim portion 51 of the wheel 23, a bolt 63 is caused to pass through an installation hole (not shown) bored in the pressing member 52, 52, and is screwed into the horse-shaped member 62 to fix the marginal portion 51a of the rim portion 51 of the wheel 23 to the rotary disk 24.

(3) In FIG. 7, by mounting the spindle shaft 131 to the wheel-side end portion 99 of the moment shaft 25 with bolts, causing the spindle shaft 131 to spline-fit into the hub 132, and screwing a nut 133 into the end portion of the spindle shaft 131, the moment shaft 25 is mounted to the wheel 23 through the hub 132 and the spindle shaft 131.

(4) In FIG. 1, after alignment of the wheel 23 by rotating it by hand, the electrically-driven motor 12 is caused to start to thereby rotate the wheel 23.

(5) In FIG. 6, the rise and fall portion 107a is caused to descend by operating the jack 107 to move the rise and fall portion 107a away from the cushion 111. Thereby, in FIG. 5, a predetermined load is exerted on the end portion of the moment shaft 25.

(6) In FIG. 1, the number of revolutions of the electrically-driven motor 12 will be increased to a predetermined number of revolutions to start the durability test of the wheel 23.

For example, when the wheel 23 is large, in order to strengthen the installation of the wheel 23 to the rotary disk 24, in FIG. 3, there is added a process for placing the pressing member 53, 53 on the marginal portion 51b in the rim portion 51 of the wheel 23, fixing these pressing members 53, 53 to the auxiliary disk 54 with bolts 58 and mounting the auxiliary disk 54 to the long body bolt 56 mounted to the rotary disk 24 with a nut 57.

As explained in the above-described FIGS. 3, 4 and 7, firstly, there is provided equipment for testing wheel durability 10 (see FIG. 1.) according to the present invention in which the marginal portion 51 a of the rim portion 51 of the wheel 23 is first mounted to the rotary disk 24. One end of the moment shaft 25 and the spindle shaft 131 which correspond to the axle is mounted to the disk portion 135 of the wheel 23. The rotary disk 24 is rotated in a state in which a load is applied to the other end of the moment shaft 25 for thereby evaluating the durability of the wheel 23. The marginal portion 51a of the wheel 23 is mounted to the rotary disk 24 while pressing with the pressing member 52, 52 obtained by dividing a ring-shaped plate into two.

By means of the pressing member 52, 52 obtained by dividing the ring-shaped plate into two, it is possible to mount the wheel 23 to the rotary disk 24 with a uniform pressing force in the circumferential direction, and to prevent rattling, local deformation and the like of the wheel 23.

Secondly, the present invention provides, as illustrated in FIG. 7, the moment shaft 25 and the spindle shaft 131 being mounted on the disk portion 135 of the wheel 23 through the hub 132 provided for the vehicle.

Through the use of the hub 132 to be actually provided for the vehicle, it is possible to confirm the fatigue strength of the wheel 23 in a state closer to the actual vehicle state. In addition, this test will confirm also the fatigue strength of the hub 132. Therefore, the test man-hours can be reduced as compared with when the fatigue strength of the wheel 23 and the hub 132 being separately confirmed.

Thirdly, the present invention provides, as illustrated in FIGS. 5 and 6, a load which is applied to the end portion of the moment shaft 25 that is generated by the weight 27.

For example, even when the wheel 23 (see FIG. 3) is damaged during the durability test and an excessive external force is exerted on the weight 27 through the moment shaft 25, the weight 27 is difficult to be damaged. When the load is applied by a hydraulic cylinder or a pneumatic cylinder instead of the weight, these cylinders are prone to be damaged by an excessive external force, and may need repair or replacement of the cylinder.

Fourthly, the present invention provides a weight 27 that is integrally mounted to the tip end of the moment shaft 25 through the weight-side bearing member 41 and the rod 42. It is possible to directly exert the load of the weight 27 on the moment shaft 25, and to enhance the testing accuracy.

In this respect, in the present invention, the load has been applied to the shaft through the use of the weight, but the present invention is not limited thereto. The load may be applied to the shaft through the use of an elastic member for example, a spring.

The present invention exhibits the following effects due to the above-described structure. In the equipment for testing wheel durability according to the present invention, since the marginal portion of the wheel is mounted to the rotary disk whale pressing with the pressing members obtained by dividing a ring-shaped plate into two, by means of the pressing members obtained by dividing the ring-shaped plate into two, it is possible to mount the wheel to the rotary disk with an uniform pressing force in the circumferential direction, and to prevent rattling, local deformation and the like to the wheel.

In the equipment for testing wheel durability according to the present invention, since the shaft is mounted to the disk portion of the wheel through the hub provided for the vehicle, through the use of the hub to be actually provided for the vehicle, it is possible to confirm the fatigue strength of the wheel in a state closer to the actual vehicle state. In addition, it is possible to confirm also the fatigue strength of the hub.

In the equipment for testing wheel durability according to the present invention, since the load is generated by the weight, for example, even when the wheel is damaged during the durability test and an excessive external force is exerted to the weight through the shaft, the weight is difficult to be damaged. In the equipment for testing wheel durability according to the present invention, since the weight is integrally mounted to the tip end of the shaft, it is possible to directly exert the load of the weight on the shaft and to enhance the testing accuracy.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. Equipment for testing wheel durability comprising:

a marginal portion of a rim portion of a wheel is mounted to a rotary disk; and one end of a shaft corresponding to an axle is mounted to a disk portion of said wheel and said rotary disk is rotated in a state in which a load is applied to the other end of the shaft for thereby evaluating durability of said wheel;

said marginal portion of said wheel is mounted to said rotary disk while pressing with a pressing member obtained by dividing a ring-shaped plate into two.

2. The equipment for testing wheel durability according to claim 1, wherein said shaft is mounted to a disk portion of said wheel through a hub provided for a vehicle.

3. The equipment for testing wheel durability according to claim 1, wherein said load is generated by a weight.

4. The equipment for testing wheel durability according to claim 3, wherein said weight is integrally mounted to the tip end of said shaft.

5. The equipment for testing wheel durability according to claim 1, and further including an auxiliary disk operatively positioned adjacent to a distal end of said rim, a second pressing member being operatively disposed adjacent to a second marginal portion of the distal end of the rim for retaining the second marginal portion relative to the auxiliary disk.

6. The equipment for testing wheel durability according to claim 5, and further including bolts for mounting the auxiliary disk relative to the rotary disk.

7. The equipment for testing wheel durability according to claim 3, and further including a weight-side bearing for supporting said load on said shaft.

8. The equipment for testing wheel durability according to claim 7, wherein said weight-side bearing includes a first bushing mounted on said shaft and a second bushing with a bearing disposed adjacent to said first bushing for supporting said load on said shaft.

9. Equipment for testing wheel durability comprising:

a rotary disk;

a marginal portion of a rim portion of a wheel being adapted to be mounted to said rotary disk;

a shaft including a first end and a distal end;

a disk portion of said wheel being adapted to be mounted to said shaft;

said rotary disk being rotated in a state in which a load is applied to the distal end of the shaft for thereby evaluating durability of said wheel; and a pressing member, said marginal portion of said wheel being adapted to be mounted to said rotary disk while being retained relative thereto by said pressing member.

10. The equipment for testing wheel durability according to claim 9, wherein said shaft is mounted to a disk portion of said wheel through a hub.

11. The equipment for testing wheel durability according to claim 9, wherein said load is generated by a weight.

12. The equipment for testing wheel durability according to claim 11, wherein said weight is integrally mounted to the tip end of said shaft.

13. The equipment for testing wheel durability according to claim 9, and further including an auxiliary disk operatively positioned adjacent to a distal end of said rim, a second pressing member being operatively disposed adjacent to a second marginal portion of the distal end of the rim for retaining the second marginal portion relative to the auxiliary disk.

14. The equipment for testing wheel durability according to claim 13, and further including bolts for mounting the auxiliary disk relative to the rotary disk.

15. The equipment for testing wheel durability according to claim 11, and further including a weight-side bearing for supporting said load on said shaft.

16. The equipment for testing wheel durability according to claim 15, wherein said weight-side bearing includes a first bushing mounted on said shaft and a second bushing with a bearing disposed adjacent to said first bushing for supporting said load on said shaft.

17. The equipment for testing wheel durability according to claim 9, wherein said pressing member is a ring-shaped plate divided into two.

* * * * *